(12) United States Patent
Ohrbom et al.

(10) Patent No.: US 7,417,102 B2
(45) Date of Patent: Aug. 26, 2008

(54) PIGMENT DISPERSANT, METHOD OF MAKING COATING COMPOSITIONS, AND COATING COMPOSITIONS

(75) Inventors: Walter H. Ohrbom, Hartland Township, MI (US); Nicholas Caiozzo, St. Clair Shores, MI (US); Sergio Balatan, West Bloomfield, MI (US); Zenon Paul Czornij, Brighton, MI (US); Clair J. Certo, Dearborn Heights, MI (US); Janice E. Echols, Detroit, MI (US); Paul J. Harris, West Bloomfield, MI (US)

(73) Assignee: BASF Corporation, Southfield, MI (US)

( * ) Notice: Subject to any disclaimer, the term of this patent is extended or adjusted under 35 U.S.C. 154(b) by 168 days.

(21) Appl. No.: 11/277,065

(22) Filed: Mar. 21, 2006

(65) Prior Publication Data

US 2007/0062412 A1    Mar. 22, 2007

Related U.S. Application Data

(63) Continuation-in-part of application No. 11/087,953, filed on Mar. 23, 2005, now abandoned.

(51) Int. Cl.
*C08F 22/26* (2006.01)
*C08F 20/26* (2006.01)
*C08F 226/02* (2006.01)

(52) U.S. Cl. .............. 526/307.3; 526/320; 526/317.1; 526/318.42; 526/329.2; 524/556

(58) Field of Classification Search .............. 526/320, 526/317.1, 318.42, 329.2, 307.3; 524/556
See application file for complete search history.

(56) References Cited

U.S. PATENT DOCUMENTS

| 5,349,036 | A | * | 9/1994 | Simpson et al. | 526/320 |
| 6,270,905 | B1 | * | 8/2001 | Swarup et al. | 428/463 |
| 2006/0217485 | A1 | * | 9/2006 | Ohrbom et al. | 524/556 |

* cited by examiner

*Primary Examiner*—Ling-Siu Choi

(57) ABSTRACT

A coating composition comprises at least one material dispersed in a vinyl or acrylic polymer, wherein the vinyl or acrylic polymer comprises (a) one or more anchor group monomer units (a) having an ionizable or active hydrogen functionality or a functionality that forms a covalent bond with the dispersed material, wherein the ionizable functionality is other than a carboxylic acid group in which the carbonyl carbon is separated from the closest ethylenically unsaturated carbon by at least four atoms and the anchor group monomer units (a) are other than those having polyoxyalkylene groups; (b) about 5% to about 45% by weight of one or more stabilizer monomer units (b) having a carboxylic acid group in which the carbonyl carbon is separated from the closest ethylenically unsaturated carbon by at least four atoms, having polyoxyalkylene groups, having gamma-hydroxy carbamate or beta-hydroxy carbamate groups, and combinations thereof; and (c) up to about 50 percent by weight of aromatic monomer units.

23 Claims, No Drawings

PIGMENT DISPERSANT, METHOD OF MAKING COATING COMPOSITIONS, AND COATING COMPOSITIONS

CROSS-REFERENCE TO RELATED APPLICATIONS

This application is a continuation-in-part of U.S. patent application Ser. No. 11/087,953 filed on Mar. 23, 2005, the disclosure of which is incorporated herein by reference.

FIELD OF THE INVENTION

The invention relates to dispersants for pigments and other organic and inorganic materials and to methods of making coating compositions and other compositions with dispersants.

BACKGROUND OF THE INVENTION

Coating finishes, particularly exterior coating finishes in the automotive industry, are generally applied in two or more distinct layers. One or more layers of primer coating composition may be applied to the unpainted substrate first, followed by one or more topcoat layers. Basecoat-clearcoat composite coatings are particularly useful as topcoats for which exceptional gloss, depth of color, distinctness of image, or special metallic effects are desired. The basecoat layer contains the colorants that provide the color for the topcoat, while the clearcoat layer provides a smooth, glossy finish. The automotive industry has made extensive use of these coatings for automotive body panels.

The colorants in automotive basecoat compositions are typically one or more dispersed pigments. Pigment dispersion in the composition must accomplish at least two objectives. First, the pigment should be as fully wet-out as possible for optimum color development in the coating layer. Secondly, the pigment should be stabilized against hard settling and re-agglomeration of the pigment particles so that the basecoat composition will have a reasonably long shelf-life. Many types of dispersants have been suggested for solventborne compositions. The options for waterborne compositions has been more limited, as the dispersant must itself be water-dispersible. Nonetheless, waterborne basecoat compositions are in need of the same good color development and stability as solventborne basecoat compositions. A pigment dispersant useful in both solventborne and waterborne compositions would simplify manufacturing and storage because the same dispersant intermediate could be synthesized and used to made pigment dispersions for either solventborne or waterborne compositions.

Enamels, including primers, bc, tinted cc, one-pack enamels.

Other materials and additives that are not water-soluble or water-dispersible in themselves are generally incorporated into coating compositions, also.

SUMMARY OF THE INVENTION

The invention provides a dispersant for pigments, resins, polymers, powder coating particles, and other organic and inorganic materials for incorporation into a solventborne or waterborne composition such as a coating composition, an ink composition, a polymer system, a finish composition, a sealant, or an adhesive or for incorporation into a solid polymer system. In one embodiment, the present invention provides pigment dispersions offering excellent color development in coating compositions, particularly for basecoat coating compositions. In certain embodiments, the dispersant is used to disperse other nonvolatile materials such as fillers, nanoparticles, colloidal silica, resins or polymers, curing agents, powder coating particulates, and/or additives in a coating composition. In certain embodiments, the dispersion formed with the dispersant includes more than one dispersed material.

A dispersion or emulsion (which terms are used herein interchangeably) of the invention comprises at least one material dispersed by a dispersing vinyl or acrylic polymer, wherein the dispersing vinyl or acrylic polymer comprises:

(a) one or more anchor group monomer units (a) having an ionizable or active hydrogen functionality or a functionality that forms a covalent bond with the dispersed material, wherein the ionizable functionality is other than a carboxylic acid group in which the carbonyl carbon is separated from the closest ethylenically unsaturated carbon by at least four atoms and the anchor group monomer units (a) are other than those having polyoxyalkylene groups;

(b) about 5% to about 45% by weight of one or more stabilizer monomer units (b) having a carboxylic acid group in which the carbonyl carbon is separated from the closest ethylenically unsaturated carbon by at least four atoms, having polyoxyalkylene groups, having gamma-hydroxy carbamate or beta-hydroxy carbamate groups, and combinations thereof; and (c) up to about 50 percent by weight of aromatic monomer units. The dispersed material may be organic, inorganic, and a combination of these.

A waterborne composition of the invention comprises an aqueous dispersion having at least one insoluble component such as a polymer, resin, curing agent, pigment, filler, nanoparticle, or additive dispersed by the dispersing vinyl or acrylic polymer of the invention.

The present invention provides pigment dispersions offering improvements in areas of optical properties, such as excellent color development in coating compositions, particularly for basecoat coating compositions, or improved dispersion efficiencies, such as reduced grind time or increased pigment loading, or improvements in stability. A pigmented coating composition of the invention comprises at least one pigment dispersed in the dispersing vinyl or acrylic polymer of the invention. The composition may be solventborne, waterborne, or a solid material such as a powder coating. In a particular embodiment, a pigmented coating composition of the invention comprises at least one pigment dispersed in a vinyl or acrylic polymer, wherein the vinyl or acrylic polymer is polymerized from a mixture of ethylenically unsaturated monomers comprising: (a) one or more monomers having active hydrogen functionality; (b) at least about 5% by weight of one or more monomers selected from the group consisting of monomers having a carboxylic acid group in which the carbonyl carbon is separated from the closest ethylenically unsaturated carbon by at least four atoms, ω-methyloxy-polyoxyethylene (meth)acrylates, ω-methyloxy-poly(oxyethylene-co-oxypropylene) (meth)acrylates, and combinations thereof; (c) optionally hydroxyethylene ethyl urea (meth)acrylate; and (d) up to about 50 percent by weight of one or more monomers selected from the group consisting of aromatic polymerizable monomers, wherein the monomers (b) and (c) combined are from about 5 to about 45 percent by weight of the mixture of ethylenically unsaturated monomers. The composition may be solventborne or waterborne.

A waterborne basecoat composition of the invention comprises an aqueous dispersion having at least one pigment dispersed by the dispersing vinyl or acrylic polymer of the invention. In a particular embodiment, a waterborne basecoat composition of the invention comprises an aqueous dispersion having at least one pigment dispersed by a vinyl or acrylic polymer, wherein the vinyl or acrylic polymer is polymerized from a mixture of ethylenically unsaturated monomers comprising: (a) one or more monomers having active hydrogen functionality; (b) at least about 5% by weight of one or more monomers selected from the group consisting of monomers having a carboxylic acid group in which the carbonyl carbon is separated from the closest ethylenically unsaturated carbon by at least four atoms, ω-methyloxy-polyoxyethylene (meth)acrylates, and combinations thereof; (c) optionally hydroxyethylene ethyl urea (meth)acrylate; and (d) up to about 50 percent by weight of one or more monomers selected from the group consisting of aromatic polymerizable monomers, wherein the monomers (b) and (c) combined are from about 5 to about 45 percent by weight of the mixture of ethylenically unsaturated monomers. Preferably, the waterborne basecoat composition also comprises a film-forming polymer other than the dispersing vinyl or acrylic polymer dispel sing the pigment, and preferably a crosslinking agent, which may be dispersed by a dispersing vinyl or acrylic polymer according to the invention.

The compositions of the invention have excellent stability. The pigmented coating compositions of the invention exhibit excellent color development, humidity resistance, and adhesion.

In a method, a material mixed with the dispersing vinyl or acrylic polymer of the invention is dispersed in a solventborne composition or in an aqueous composition. The method comprises: preparing a mixture of the material and the dispersing vinyl or acrylic polymer; and dispersing the mixture in one of: an aqueous composition, ionizing any ionizable groups if necessary, or a solventborne composition.

As used herein, "(meth)acrylate" refers to both the acrylate and methacrylate compound. "Acrylics" or "acrylic polymers" refer to vinyl copolymers that include at least one polymerized (meth)acrylate monomer. "A" and "an" as used herein indicate "at least one" of the item is present; a plurality of such items may be present, when possible. "About" as applied to values indicates some slight imprecision in the value (with some approach to exactness in the value; approximately or reasonably close to the value; nearly). If the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

A material is dispersed or emulsified in a composition having an aqueous or organic liquid medium using the vinyl or acrylic polymer dispersant of the invention. "Dispersed," "dispersions," as other forms of the word "disperse" are used in this disclosure to encompass "emulsified," "emulsions," and other, corresponding forms of the word "emulsify." For convenience, the dispersing vinyl polymer will be referred to hereinafter as an acrylic polymer, although it should be understood that in certain embodiments the dispersing vinyl polymer may not include any (meth)acrylate monomer units.

The dispersing acrylic polymer disperses a material in a composition such as a coating composition, an ink composition, a polymer system, a solid polymer system, a finish composition, a sealant, or an adhesive. The material may be a solid such as a pigment or filler or a liquid such as a resin or polymer below its glass transition temperature. The dispersed material may be organic or inorganic. Nonlimiting examples of such materials that may be dispersed include pigments, fillers, nanoparticles, polymers and resins, powder coating particles, curing agents, colloidal silica, ultraviolet light absorbers including hindered amine light absorbers, antioxidants, catalysts, and so on.

Nonlimiting examples of pigments and fillers that may be dispersed include any organic or inorganic compounds or colored materials. Examples of suitable classes of organic pigments that may be used include, without limitation, metallized and non-metallized azo pigments, azomethine pigments, methine pigments, anthraquinone pigments, phthalocyanine pigments, perinone pigments, perylene pigments, diketopyrrolopyrrole pigments, thioindigo pigments, iminoisoindoline pigments, iminoisoindolinone pigments, quinacridone pigments such as quinacridone reds and violets, flavanthrone pigments, indanthrone pigments, anthrapyrimidine pigments, carbazole pigments, monoarylide and diarylide yellows, benzimidazolone yellows, tolyl orange, naphthol orange, and quinophthalone pigments. Examples of suitable inorganic pigments include, without limitation, metal oxide pigments such as titanium dioxide, iron oxides including red iron oxide, black iron oxide, and brown iron oxide, and chromium oxide green; carbon black; bismuth vanadate; ferric ferrocyanide (Prussian blue); ultramarine; lead chromate; and so on. Examples of suitable fillers include, without limitation, barytes, talc, and calcium carbonate.

Nonlimiting examples of nanoparticles that may be dispersed include colloidal silica, bentonite clay, carbon nanotubes, inorganic oxides, and transparent pigments.

Nonlimiting examples of polymers, resins, and curing agents that may be dispersed include polyesters, polyurethanes, other acrylic polymers, polycarbonates, polyethers, monomeric, oligomeric, and polymeric aminoplasts and polyisocyanates, and combinations of these. In general, thermosetting materials (such as for curable coating compositions) will include a plurality of crosslinkable groups.

A number of additives such as ultraviolet light absorbers including hindered amine light absorbers, antioxidants, catalysts, and so on may be dispersed using the dispersing acrylic polymer. It is particularly beneficial to disperse in this way such additives that are insoluble or sparingly soluble in a composition.

Powder coating particles may also be dispersed using the dispersing acrylic polymer. Powder coating particles may be manufactured, for examples, by melt mixing film forming ingredients that are normally solid at room temperature, along with desired additives, pigments, and other coating materials. The powder coating is melt mixed, for example, in an extruder, then the extrudate is cooled to solidify it, then pulverized or ground to a desired particle size distribution. Examples of powder coatings are described in U.S. Pat. No. 6,710,103 (Norris et al.), U.S. Pat. No. 6,669,984 (Anchor et al.), U.S. Pat. No. 6,599,993 (Norris et al.), U.S. Pat. No. 5,552,487 (Clark et al), U.S. Pat. No. 5,536,785 (Foukes et al.), and U.S. Pat. No. 5,508,349 (Clark et al), each of which is incorporated herein by reference. The powder coating particles may be dispersed in an aqueous medium with the dispersing acrylic polymer to form a powder slurry, for example by mixing together powder coating particles of a first average particle size, the dispersing acrylic, and an aqueous medium, then milling or grinding the mixture to reduce the average particle size of the powder coating particles to a second, smaller average particle size, at the same time bringing about a dispersion of the powder coating particles in the aqueous medium, the dispersion stabilized by the dispersing acrylic polymer. Reference is made to powder coating slurries and methods of forming them in U.S. Pat. No. 6,812,316 (Ohrbom et al.), U.S. Pat. No. 6,391,969 (Harris et al.), and U.S. Pat. No. 6,360,974 (Sacharski et al.) each of which is incorporated herein by reference, which contain further details on powder slurry compositions and preparation methods.

In one embodiment, the coating composition includes at least one pigment dispersed in the dispersing acrylic polymer.

The dispersing acrylic polymer comprises one or more kinds of monomer units (a) have anchor groups that associate with the dispersed material, one or more kinds of monomer units (b) having stabilizing groups that stabilized the dispersed material in the dispersion medium, and, optionally, aromatic monomer units.

Examples of suitable ethylenically unsaturated monomers that may be used to provide the anchor groups of monomer units (a) include, without limitation, acidic monomers such as acrylic acid, methacrylic acid, ethacrylic acid, crotonic acid, maleic acid and its monoesters, fumaric acid and its monoesters, itaconic acid and its monoesters, vinylbenzoic acid (all isomers), alpha-methylvinylbenzoic acid (all isomers), p-vinylbenzenesulfonic acid or p-vinylbenzenephosphonic acids or their partial esters or mono(meth)acryloyloxyethyl maleate, succinate or phthalate; amino monomers such as t-butylaminoethyl (meth)acrylate, dimethylaminoethyl(meth)acrylate, diethylaminoethyl (meth)acrylate, N,N-dimethylaminopropyl acrylamide, N,N-diethylamino-alpha-methylstyrene (all isomers), N,N-diethylaminostyrene (all isomers), allylamine, crotylamine, glycidyl(meth)acrylate or other glycidyl-containing ethylenically unsaturated monomers in which the glycidyl group is reacted before, during, or after polymerization with monoamines such as (without limitation) cyclohexylamine, amino acids, hydroxyl-functional ethylenically unsaturated monomers such as hydroxyethyl (meth)acrylate, hydroxypropyl(meth)acrylate, and hydroxybutyl(meth)acrylate, and esters of epsilon caprolactone and hydroxyalkyl(meth)acrylates such as the commercially available Tone 100M monomer (from Dow Chemical), acrylamide, methacrylamide, carbamate alkyl(meth)acrylates, carbamyloxyalkyl(meth)acrylates such as 2-carbamyloxyethyl methacrylate and 4-carbamyloxybutyl acrylate, alkoxysilane- or silanol-functional monomers such as triethoxysilane, ethylenically unsaturated monomers having urea or hydrazide groups such as hydroxyethylene ethyl urea (meth) acrylate, and suitable combinations (e.g., combinations that do not lead to gelling) of such monomers. Hydroxyl and carbamate functionalities are preferred. The acrylic polymer preferably has an active hydrogen group equivalent weight of from about 400 to about 2000, more preferably from about 400 to about 1000.

Nonlimiting examples of addition polymerizable monomers that may be used to provide monomer units (b) having stabilizing groups are those having a carboxylic acid group in which the carbonyl carbon is separated from the closest ethylenically unsaturated carbon by at least four atoms including oligomers of (meth)acrylic acid, particularly β-carboxyethyl acrylate, and the reaction products of hydroxyalky(meth)acrylates (e.g., hydroxyethyl methacrylate, hydroxypropyl acrylate) with cyclic carboxylic acid anhydrides (e.g., succinic anhydrides isophthalic anhydride), such as monomethacryloyloxyethyl hexahydrophthalate; those having ether chains such as ω-methyloxy-polyoxyethylene (meth)acrylates, ω-methyloxy-poly(oxyethylene-co-oxypropylene) (meth)acrylates, ω-methyloxy-polyoxyethylene (meth)acrylates, ω-methyloxy-poly(oxyethylene-co-oxypropylene) (meth)acrylates, ω-amino-polyoxyethylene (meth)acrylates, ω-amino-poly(oxyethylene-co-oxypropylene) (meth)acrylates, acid-functional reaction products of ω-methyloxy-polyoxyethylene (meth)acrylates, ω-methyloxy-poly(oxyethylene-co-oxypropylene) (meth)acrylates, ω-hydroxy-polyoxyethylene (meth)acrylates, and ω-hydroxy-poly(oxyethylene-co-oxypropylene) (meth)acrylates with cyclic anhydrides, beta- and gamma-carbamyloxyhydroxyalkyl (meth)acrylates such as 2-carbamyloxy-3-hydroxypropyl methacrylate and 3-cabamyloxy-2-hydroxypropyl methacrylate.

Preferred examples of ethylenically unsaturated monomers providing monomer units (b) include β-carboxyethyl acrylate, monomethacryloyloxyethyl hexahydrophthalate, ω-methyloxy-polyoxyethylene (meth)acrylates and ω-methyloxy-poly(oxyethylene-co-oxypropylene) (meth)acrylates having molecular weights of at least about 750, more preferably at least about 1000, and those having molecular weights of up to about 4500, more preferably up to about 3000, and still more preferably up to about 2500. The mixture of ethylenically unsaturated monomer used to prepare the dispersing acrylic polymer preferably includes one or more monomers having a carboxylic acid group in which the carbonyl carbon is separated from the closest ethylenically unsaturated carbon by at least four atoms in an amount sufficient so that the acrylic polymer has an acid equivalent weight of 800 or more grams per equivalent, more preferably an equivalent weight of about 2000 or less and from about 1000 or more grams per equivalent. The mixture of ethylenically unsaturated monomer used to prepare the dispersing acrylic polymer preferably includes up to about 20 percent by weight of one or more ω-methyloxy-polyoxyethylene (meth)acrylates, more preferably up to about 15% by weight of one or more ω-methyloxy-polyoxyethylene (meth)acrylates, and also preferably at least about 5% by weight of the one or mole ω-methyloxy-polyoxyethylene (meth)acrylates. In the case of forming an aqueous dispersion, a sufficient amount of the stabilizer monomer units are incorporated into the dispersing acrylic polymer so that the polymer is water-soluble or water-dispersible. On the other hand, it is advantageous to not incorporate an excess of such groups over the sufficient amount to make the polymer water-soluble or water-dispersible to avoid reducing the water resistance of the coatings, adhesive films, ink, seals, and other products made with the compositions of the invention. In general, the stabilizer monomer units may be included in amounts from 9 to 200 meq/100 g dispersing acrylic polymer, in certain embodiment in amounts from 20 to 150 meq/100 g dispersing acrylic polymer, and in certain embodiment in amounts from 30 to 100 meq/100 g dispersing acrylic polymer.

Nonlimiting examples of addition polymerizable monomer's that can be used to provide an aromatic monomer unit include vinylaromatic hydrocarbons such as styrene, vinyltoluene, diphenylethylene and alpha-alkylstyrenes, such as alpha-methylstyrene The dispersant acrylic polymer includes at least about 5% by weight, preferably about 5% to about 45% by weight, of one or more stabilizer monomer units (b).

In certain embodiments, the acrylic polymer is polymerized from a mixture of ethylenically unsaturated monomers comprising: (a) one of more monomers having active hydrogen functionality; (b) at least about 5% by weight of one or more monomers selected from the group consisting of monomers having a carboxylic acid group in which the carbonyl carbon is separated from the closest ethylenically unsaturated carbon by at least four atoms, ω-methyloxy-polyoxyethylene (meth)acrylates, ω-methyloxy-poly(oxyethylene-co-oxypropylene) (meth)acrylates, and combinations thereof; optionally hydroxyethylene ethyl urea (meth)acrylate in combination with the aforementioned type (b) monomer's; and (c) up to about 50 percent by weight of one or mole monomers selected from the group consisting of aromatic polymerizable monomers, wherein the monomers (b) having a carboxylic acid group in which the carbonyl carbon is separated from the closest ethylenically unsaturated carbon by at least four atoms, having polyether groups, and combinations thereof and the optional hydroxyethylene ethyl urea (meth)acrylate combined are from about 5 to about 45 percent by weight of the mixture of ethylenically unsaturated monomers. Nonextended acids, meaning polymerizable vinyl acids that have fewer than 4 atoms between the vinyl group and the carboxylic acid group, may be used in combination with the monomers (b) having carboxylic acid groups, provided the monomers (b) having carboxylic acid groups are at least 5% by weight of the monomer mixture used to prepare the copolymer. Up to 50% by weight of the total acid-functional monomer may be the nonextended acid, preferably less than 25% by weight, most preferably less than 10% by weight. Optionally, the mixture of ethylenically unsaturated monomers used to prepare the dispersing acrylic polymer includes hydroxyethylene ethyl urea methacrylate and/or hydroxyethylene ethyl urea acrylate. The mixture of ethylenically unsaturated monomer used to prepare the dispersing acrylic polymer includes preferably up to about 10 percent by weight, more preferably up to about 7% by weight hydroxyethylene ethyl urea (meth)acrylate, and also preferably includes at least about 1% by weight, more preferably at least about 2% by weight, and still more preferably at least about 3% by weight hydroxyethylene ethyl urea (meth)acrylate.

Together the stabilizer monomers (b) selected from the group consisting of additional polymerizable monomers having a carboxylic acid group in which the carbonyl carbon is separated from the closest ethylenically unsaturated carbon by at least four atoms, addition polymerizable monomers having polyoxyalkylene groups, addition polymerizable monomers having gamma-hydroxy carbamate or beta-hydroxy carbamate groups, and combinations thereof and the monomer hydroxyethylene ethyl urea (meth)acrylate comprise at least about 5 weight percent, more preferably at least about 15 weight percent of the mixture of ethylenically unsaturated monomers polymerized to form the acrylic polymer. It is also preferred that together the stabilizer monomers (b) additional polymerizable monomers having a carboxylic acid group in which the carbonyl carbon is separated from the closest ethylenically unsaturated carbon by at least four atoms, addition polymerizable monomers having polyoxyalkylene groups, addition polymerizable monomers having gamma-hydroxy carbamate or beta-hydroxy carbamate groups, and combinations thereof and the monomer hydroxyethylene ethyl urea (meth)acrylate comprise up to about 45 weight percent, more preferably up to about 35 weight percent of the mixture of ethylenically unsaturated monomers polymerized to form the acrylic polymer.

The mixture of ethylenically unsaturated monomers polymerized to form the acrylic polymer preferably includes one or more aromatic polymerizable monomers. Suitable examples of aromatic polymerizable monomers include, without limitation, styrene, α-methyl styrene, vinyl toluene, tert-butyl styrene, and combinations of these. The mixture of ethylenically unsaturated monomer used to prepare the dispersing acrylic polymer preferably includes at least about 5 percent, more preferably at least about 15 percent by weight of one or more aromatic polymerizable monomers. The mixture of ethylenically unsaturated monomer used to prepare the dispersing acrylic polymer includes up to about 50 percent, preferably up to about 30 percent, and more preferably up to about 25 percent by weight of one or more aromatic polymerizable monomers.

The mixture of ethylenically unsaturated monomers may include other polymerizable monomers, such as, for example and without limitation, esters of α,β-ethylenically unsaturated monocarboxylic acids containing 3 to 5 carbon atoms such as acrylic, methacrylic, and crotonic acids; mono- and di-esters of α,β-ethylenically unsaturated dicarboxylic acids containing 4 to 6 carbon atoms; vinyl esters, vinyl ethers, vinyl ketones, and heterocyclic aliphatic vinyl compounds. Representative examples of suitable esters of acrylic, methacrylic, and crotonic acids include, without limitation, those esters from reaction with saturated aliphatic alcohols containing 1 to 20 carbon atoms, such as methyl, ethyl, propyl, isopropyl, n-butyl, isobutyl, tert-butyl; hexyl, 2-ethylhexyl, dodecyl, cyclohexyl, alkyl-substituted cyclohexyl, alkanol-substituted cyclohexyl, such as 2-tert-butyl and 4-tert-butyl cyclohexyl, 4-cyclohexyl-1-butyl, and 3,3,5,5,-tetramethyl cyclohexyl; isobornyl, lauryl, and stearyl acrylates, methacrylates, and crotonates. Representative examples of other ethylenically unsaturated polymerizable monomers include, without limitation, such compounds as fumaric, maleic, and itaconic monoesters, and diesters with alcohols such as methanol, ethanol, propanol, isopropanol, butanol, isobutanol, and tert-butanol. Representative examples of co-polymerizable vinyl monomers include, without limitation, such compounds as vinyl acetate, vinyl propionate, vinyl ethers such as vinyl ethyl ether, vinyl and vinylidene halides, vinyl ethyl ketone, and 2-vinyl pyrrolidone.

The acrylic polymer is prepared according to usual methods, such as by bulk or solution polymerization. In some applications, it may be preferred for the acrylic polymer to have a weight average molecular weight of from about 8,000 to about 70,000. Weight average molecular weights may be determined by gel permeation chromatography using polystyrene standards. The glass transition temperatures may vary widely, depending upon the application for which the composition is made. A theoretical glass transition temperature may be calculated by the well-known Fox equation, and actual glass transition temperatures may be measured by standard thermal techniques such as differential scanning calorimetry. In general, theoretical glass transitions temperatures may be from −30 to +180° C., while in some applications narrower ranges such as from 0 to 120° C. may offer better properties.

After polymerization, any acid functionality may be salted, preferably with an alkali or base, preferably an amine, even more preferably a tertiary amine. Examples of suitable salting materials include, without limitation, ammonia, ammonium salts such as ammonium carbonate or ammonium hydrogen carbonate, monoethanolamine, ethylamine, dimethylamine, triethylamine, diethylamine, triethylamine, propylamine, dipropylamine, isopropylamine, diisopropylamine, triethanolamine, butylamine, dibutylamine, 2-ethylhexylamine, ethylenediamine propylenediamine, ethylethanolamine, dimethylethanolamine, diethylethanolamine, 2-amino-2-methylpropanol, diethylaniline, triphenylamine, and morpholine. Preferred salting materials include 2-amino-2-methylpropanol and dimethylethanolamine. Any amino functionality may be salted with an acid, nonlimiting examples of which are sulfuric acid, hydrochloric acid, phosphoric acid, formic acid, acetic acid, lactic acid, dimethylolpropionic acid or citric acid.

The acrylic polymers may be prepared as solutions in an organic solvent medium. For aqueous coating compositions, the organic solvent or solvents are preferably selected from water-soluble or water-miscible organic solvents, and after polymerization the acrylic polymers are dispersed into water. After dispersion into water, the organic solvent can be distilled from the aqueous dispersion or emulsion.

The acrylic polymers may also be prepared by emulsion polymerization. Preferably, a nonionic or an anionic surfactant is used for the emulsion polymerization. Suitable surfactants include, without limitation, polyoxyethylenenonylphenyl ethers, polyoxyethylenealkylallyl ether sulfuric acid esters, amino and alkali salts of dodecylbenzenesulfonic acid such as the dimethylethanolamine salt of dodecylbenzenesulfonic acid and sodium dodecylbenzenesulfonic acid, and sodium dioctylsulfosuccinate.

The polymerization may be carried out by flee radical polymerization. The free radical source is typically supplied by a redox initiator or by an organic peroxide or azo compound. Useful initiators include, without limitation, ammonium peroxydisulfate, potassium peroxydisulfate, sodium metabisulfite, hydrogen peroxide, t-butyl hydroperoxide, dilauryl peroxide, t-butyl peroxybenzoate, 2,2'-azobis(isobutyronitrile), and redox initiators such as ammonium peroxydisulfate and sodium metabisulfite with ferrous ammonium sulfate. Optionally, a chain transfer agent may be used. Typical chain transfer agents include mercaptans such as octyl mercaptan, n- or tert-dodecyl mercaptan, thiosalicyclic acid, mercaptoacetic acid, and mercaptoethanol; halogenated compounds; and dimeric alpha-methyl styrene. The polymerization may also be carried out by anionic polymerization, cationic polymerization, controlled radical polymerization, and other addition polymerization techniques.

In pigmented coating embodiments, the color pigment or pigments are dispersed in the acrylic polymer according to known methods. In general, dry pigment and the acrylic polymer are brought into contact under a shear high enough to break the pigment agglomerates down to the primary pigment particles and to wet the surface of the pigment particles. The breaking of the agglomerates and wetting of the primary pigment particles are important for pigment stability and color development. All of the pigments may be dispersed together in the acrylic polymer or separate pigment dispersions may be made for one or more pigments that are then combined in the coating composition.

The coating composition may also include fillets and/or metallic or other inorganic flake materials such as pearlescent mica flake pigments or metallic flake pigments such as aluminum flake. Metallic basecoat colors are produced using one or more special flake pigments. Metallic colors are generally defined as colors having gonioapparent effects. For example, the American Society of Testing Methods (ASTM) document F284 defines metallic as "pertaining to the appearance of a gonioapparent material containing metal flake." Metallic basecoat colors may be produced using metallic flake pigments like aluminum flake pigments, copper flake pigments, zinc flake pigments, stainless steel flake pigments, and bronze flake pigments and/or using pearlescent flake pigments including treated micas like titanium dioxide-coated mica pigments and iron oxide-coated mica pigments to give the coatings a different appearance when viewed at different angles. Unlike the solid color pigments, the flake pigments do not agglomerate and are not ground under high shear because high shear would break or bend the flakes or their crystalline morphology, diminishing or destroying the gonioapparent effects. The flake pigments may be dispersed with the acrylic polymer, but may also be dispersed with the crosslinker or another film-forming resin or polymer, by stirring under low shear.

When the coating composition is a basecoat composition, it typically has a pigment to binder ratio of about 0.04 to about 1.5, depending on the pigments used.

The coating compositions of the present invention preferably also include a film-forming polymer or resin other than the dispersing acrylic polymer. Suitable examples of such film-forming polymers and resins include, without limitation, acrylic polymers, polyesters, polyurethanes, and modified polyurethanes such as graft copolymers. The film-forming polymers and resins generally have reactive groups, such as active hydrogen groups, particularly hydroxyl groups. In certain embodiment, the film forming materials comprises a resin or polymer having reactive groups and a crosslinker that reacts with those reactive groups to form a thermoset or crosslinked film. The film forming materials may also comprise materials curable with actinic radiation.

The coating compositions of the present invention preferably include a crosslinker component, which may be dispersed by the dispersing acrylic polymer. The crosslinker component includes one or more crosslinkers reactive with active hydrogen functionality. Examples of crosslinkers reactive with active hydrogen functionality include, without limitation, materials having activated amines, epoxide groups, silanol groups, silanol groups, silyl esters, amides, active methylol or methylalkoxy groups, including aminoplast resins or phenol/formaldehyde adducts; blocked polyisocyanate curing agents; tris(alkoxy carbonylamino) triazines (available from Cytec Industries under the name TACT); and combinations thereof. Suitable aminoplast resins are activated amine/aldehyde condensates, preferably at least partially etherified, and most preferably fully etherified. Useful activated amines for condensation with aldehydes include, without limitation, aromatic amines, ureas, and carbamates, Melamine, carbamates, and urea are preferred amines, but other triazines, triazoles, diazines, guanidines, or guanamines may also be used to prepare the alkylated amine/aldehyde aminoplast resins crosslinking agents. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxy methylated melamine; urea formaldehyde resins including methylol ureas and siloxy ureas such as butylated urea formaldehyde resin, alkylated benzoguanimines, guanyl ureas, guanidines, biguanidines, polyguanidines, and the like. Monomeric melamine formaldehyde resins are particularly preferred. The preferred alkylated melamine formaldehyde resins are water miscible or water soluble. Examples of blocked polyisocyanates include isocyanurates of toluene diisocyanate, isophorone diisocyanate, and hexamethylene diisocyanate blocked with a blocking agent such as an alcohol, an oxime, or a secondary amine such as pyrazole or substituted pyrazole.

The crosslinker component preferably is from about 2% by weight to about 40% by weight, and more preferably from about 15% by weight to about 35% by weight, and particularly preferably about 20% to about 30% by weight of the combined nonvolatile weights of the film-forming materials.

The coating compositions may include one or more catalysts. The type of catalyst depends upon the particular crosslinker component composition utilized. Useful catalysts include, without limitation, blocked acid catalysts, such as para-toluene sulfonic acid, dodecylbenzene sulfonic acid, and dinonylnaphthylene disulfonic acid blocked with amines;

phenyl acid phosphate, monobutyl maleate, and butyl phosphate, hydroxy phosphate ester; Lewis acids, zinc salts, and tin salts, including dibutyl tin dilaurate and dibutyl tin oxide.

The compositions may be solventborne or waterborne. Suitable solvents for solventborne compositions include, without limitation, esters, alcohols, and substituted aromatic solvents. Waterborne compositions may include, in addition to water, organic cosolvents such as, without limitation, alkyl ethers of propylene and ethylene glycol and dimmers thereof. In certain embodiments, the dispersing acrylic polymer is capable of dispersing material in either a solventborne or a waterborne composition. In certain instances, an ionizable functionality, such as carboxyl functionality or amino functionality, of the dispersing acrylic polymer is ionized when forming an aqueous composition and not ionized when forming a nonaqueous or solventborne composition In other embodiments the dispersing polymer disperses a material in an organic material, e.g. a polymer or resin melt, that may afterward be shaped or formed into a solid article. In such an instance, the dispersing polymer may improve physical properties of the organic material.

Other conventional materials, such as flow control or rheology control agents, antioxidants, hindered amine light absorbers, and other conventional coatings additives may be added to the compositions. In terms of method the application of the coating materials of the invention has no special features but may instead take place by any customary application method, such as spraying, knifecoating, brushing, flow coating, dipping, trickling or rolling, for example. Preference is given to employing splay application methods, such as compressed air spraying, airless spraying, high-speed rotation, electrostatic spray application (ESTA), alone or in conjunction with hot spray application such as hot air spraying, for example.

Suitable substrates include all surfaces to be coated which are not damaged by curing of the coatings present thereon using heat and/or actinic radiation; examples include metals, plastics, wood, ceramic, stone, textile, fiber composites, leather, glass, glass fibers, glasswool and rockwool, mineral-bound and resin-bound building materials, such as plasterboard and cement slabs or roofing shingles, and also composites of these materials. Accordingly, the coating material of the invention is suitable for applications outside of automotive finishing as well. In that context it is particularly suitable as an architectural coating material for the interior and exterior, for the coating of furniture and for industrial coating, including coil coating, container coating, and the impregnation or coating of electrical components. In the context of the industrial coatings it is suitable for coating virtually all parts for private or industrial use such as radiators, domestic appliances, small metal parts such as nuts and bolts, hubcaps, wheel rims, packaging or electrical components such as motor windings or transformer windings.

The coating compositions of the present invention may be enamels, such as primers and one-coat topcoats, or may be a tinted clearcoat. The coating compositions of the present invention, however, are preferably applied as basecoats on automotive articles, such as metal or plastic automotive bodies or elastomeric fascia. It is preferred to have a layer of a primer surfacer before application of the basecoat coating composition of the invention. A clearcoat composition is preferably applied over the basecoat composition.

A preferred composite coating of the invention has, as one or more layers, basecoat coating layers that are obtained from the basecoat compositions of the invention. The composite coating has a clearcoat layer applied over the basecoat coating layer. Crosslinking compositions are preferred for forming the clearcoat layer. Coatings of this type are well-known in the art and include waterborne compositions as well as solventborne compositions. For example, the clearcoat according to U.S. Pat. No. 5,474,811 may be applied wet-on-wet over a layer of the basecoat composition. Polymers known in the art to be useful in clearcoat compositions include, without limitation, acrylics, vinyl, polyurethanes, polycarbonates, polyesters, alkyds, and polysiloxanes. Acrylics and polyurethanes are preferred. Thermoset clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on, including groups that may be cured with actinic radiation. The polymer may be self-crosslinking, or, preferably, the composition may include a crosslinking agent such as a polyisocyanate or an aminoplast resin of the kind described above. In one embodiment, waterborne clearcoat compositions having low volatile organic content are used. The waterborne clearcoat compositions preferably has a volatile organic content of less than about 1.5, more preferably less than about 1.3.

Each layer of the composite coatings of the invention can be applied to an article to be coated according to any of a number of techniques well-known in the art. These include, for example, spray coating, dip coating, roll coating, curtain coating, and the like. If an initial electrocoat primer layer is applied to a metallic substrate, the electrocoat primer is applied by electrodeposition. For automotive applications, the primer surfacer coating composition, basecoat composition of the invention, and the clearcoat composition layers are preferably applied by spray coating, particularly electrostatic spray methods. Coating layers of one mil or more are usually applied in two or more coats, separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

Basecoat-clearcoat topcoats are usually applied wet-on-wet. The compositions are applied in coats separated by a flash, as described above, with a flash also between the last coat of the basecoat composition and the first coat the clearcoat composition. The two coating layers ale then cured simultaneously. Preferably, the cured basecoat layer is 0.5 to 1.5 mils thick, preferably a thickness at least to hiding, and the cured clear coat layer is 1 to 3 mils, more preferably 1.6 to 2.2 mils, thick.

The coating compositions described are preferably cured, for example at room temperature of at with heat. Curing temperatures are preferably from about room temperature to about 180° C. Typical curing times at these temperatures range from 15 to 60 minutes, and preferably the temperature is chosen to allow a cure time of from about 15 to about 30 minutes. In a preferred embodiment, the coated article is an automotive body or part. Presently, an typical heat-curing automotive coating is baked at about 110° C. to about 150° C. The coating compositions may also be curable with actinic radiation, or may be a "dual cure" coating, curing with both actinic radiation and heat.

Materials may be dispersed with the dispersing acrylic polymer in an analogous way into a variety of other compositions, including ink compositions, polymer systems, finish compositions, sealants, and adhesives, each of which may in some cases be solventborne, aqueous, or contain no organic solvent or water.

The invention is further described in the following examples. The examples ale merely illustrative and do not in any way limit the scope of the invention as described and claimed.

EXAMPLES

Example 1

Pigment Dispersant of the Invention

A suitable reactor was charged with 450 parts by weight of propylene glycol monopropyl ether, which was heated under an inert atmosphere to 140° C. Then a mixture of 92 parts by weight of Sipomer B-CEA (Rhodia, Cranbury, N.J.), 132.5 parts by weight of 2-hydroxyethyl acrylate, 32.5 parts by weight of methyl methacrylate, 128.6 parts by weight of butyl methacrylate, 42.6 parts by weight of 2-ethylhexyl acrylate, 123.7 parts by weight of styrene, 32.5 parts by weight of 1-(2-methacryloyloxyethyl)-2-imidazolidinone, 65 parts by weight of M-230 (Kowa American Corp NY, N.Y.), 8.3 parts by weight of t-butyl peracetate, and 8.3 parts by weight of odorless mineral spirits was added to the reactor over a 3-hour time period. Next 20 parts by weight of propylene glycol monopropyl ether were added and the reaction mixture kept at 140° C. for 50 minutes. The reaction mixture was cooled to 110° C., and a mixture of 9.7 parts by weight of t-butyl peroxy-2-ethylhexanoate and 20 parts by weight of propylene glycol monopropyl ether was added over a 20-minute time period. Then 10 parts by weight of propylene glycol monopropyl ether were added and the reaction mixture held at 110° C. for 1 hour. The reaction mixture was then cooled. 167 parts of a 20% mixture of aminopropanol in deionized water was added, followed by 346.4 parts of deionized water. The final resin had a measured nonvolatile content of 41.2% by weight.

Example 2

Red Pigment Composition According to the Invention

A red pigment composition was prepared by adding 14.31 parts by weight perylene pigment (C.I. Pigment Red 179) to a stirred mixture of 33.48 parts by weight pigment dispersant resin prepared in accordance with Example 1, 4.58 parts by weight propylene glycol n-propyl ether, 45.71 parts deionized water, and 1.92 parts by weight of a commercial polyalkylene additive. The resultant mixture was stirred on a Cowles disperser for thirty minutes and milled in an Eiger bead mill for two and a half hours.

Comparative Example A

Comparative Red Pigment Composition

A comparative red pigment composition was prepared by adding 14.31 parts by weight perylene pigment (C.I. Pigment Red 179) to a stirred mixture of 16.74 parts by weight of an acrylic grind resin that was not prepared according to the invention, 16.74 parts by weight of a polyurethane resin, 4.58 parts by weight propylene glycol n-propyl ether, 45.71 parts deionized water, and 1.92 parts by weight of a commercial polyalkylene additive. The resultant mixture was stirred on a Cowles disperser for thirty minutes and milled in an Eiger bead mill for two and a half hours.

Example 3

Blue Pigment Composition According to the Invention

A blue pigment composition was prepared by adding 14.28 parts by weight indanthrone pigment (C.I. Pigment Blue 60) to a stirred mixture of 19.04 parts by weight pigment dispersant resin prepared in accordance with Example 1, 8.57 parts by weight propylene glycol n-propyl ether; and 58.11 parts by weight deionized water. The resultant mixture was stirred on a Cowles disperser for thirty minutes and milled in an Eiger bead mill for ten hours.

Comparative Example B

Comparative Blue Pigment Composition

A blue pigment paste was prepared by adding 14.28 parts by weight indanthrone pigment (C.I. Pigment Blue 60) to a stirred mixture of 19.04 parts by weight of an acrylic grind resin that was not prepared according to the invention, 8.57 parts by weight propylene glycol n-propyl ether, and 58.11 parts by weight deionized water. The resultant mixture was stirred on a Cowles disperser for thirty minutes and milled in an Eiger bead mill for ten hours.

Example 4

Coating Composition According to the Invention

A coating composition was prepared that contained the led pigment composition of Example 2 by combining with rapid stirring 79.94 parts by weight of an unpigmented basecoat mixture, 16.18 parts by weight of the red pigment composition of Example 2, 1.16 parts by weight of a black tinting paste (prepared by mixing an anionic polyurethane resin with carbon black pigment, stirring the mixture on a Cowles disperser for thirty minutes, and milling the stirred mixture in an Eiger bead mill for two and one-half hours), and 7.72 parts by weight of a mica pigment dispersion (prepared by slurrying 2.20 parts by weight iron oxide coated mica in a combination of 2.54 parts by weight of polyester resin and 2.54 parts by weight propylene glycol n-propyl ether, then adding 0.44 parts by weight of a 20% aqueous solution of amine). Stirring was continued for about thirty minutes.

Comparative Example C

Comparative Coating Composition

A coating composition was prepared according to Example 4, except that the 16.18 parts by weight of the red pigment composition of Example 2 was replaced by 16.18 parts by weight of the comparative led pigment composition of Comparative Example A.

Example 5

Coating Composition According to the Invention

A coating composition was prepared that contained the blue pigment composition of Example 3 by combining with rapid stirring 82.62 parts by weight of the unpigmented basecoat mixture used in Example 4 and 7.83 parts by weight of the blue pigment composition of Example 3 premixed with 9.55 parts by weight of an aluminum pigment dispersion (prepared by slurrying 4.01 parts by weight aluminum pigment in a combination of 2.55 parts by weight of polyester resin and 2.55 parts by weight propylene glycol n-propyl ether; then adding 0.44 parts by weight of a 20% aqueous solution of amine). Stirring was continued for about thirty minutes.

Comparative Example D

Comparative Coating Composition

A coating composition was prepared according to Example 5, except that the 7.83 parts by weight of the blue pigment composition of Example 3 was replaced by 7.83 parts by weight of the comparative blue pigment composition of Comparative Example B.

Testing of Coating Compositions

The coating compositions of Examples 4 and 5 and Comparative Examples C and D were applied as basecoats and cured according to established procedures and equipment.

The color development in the coatings and stability of the coating compositions were compared. The film derived from the coating composition of Example 4 and Example 5 showed excellent metallic effect as a result of good transparency in the red pigment and blue pigment, respectively. The coating compositions of Examples 4 and 5 showed no instability after makeup and storage.

The basecoat coating colors were measured by a goniospectrophotometer at 25 degrees from specular with results as indicated below.

| Coating Composition | L* (brightness) | a* (red index) | b* (yellow index) |
|---|---|---|---|
| Example 4 | 26.3 | 40.2 | 20.4 |
| Comparative Example C | 24.9 | 38.8 | 19.7 |
| Example 5 | 67.05 | −6.24 | −40.03 |
| Comparative Example D | 65.10 | −6.85 | −42.52 |

The description of the invention is merely exemplary in nature and, thus, variations that do not depart from the gist of the invention ale intended to be within the scope of the invention. Such variations are not to be regarded as a departure from the spirit and scope of the invention.

What is claimed is:

1. A composition, comprising a dispersant and at least one material dispersed by the dispersant; wherein the dispersant comprises a vinyl or acrylic polymer comprising
   (a) one or more anchor group monomer units (a) having at least one of an ionizable functionality, an active hydrogen functionality, a functionality that forms a covalent bond with the dispersed material, or a combination thereof, wherein the ionizable functionality is other than a carboxylic acid group in which the carbonyl carbon is separated from the closest ethylenically unsaturated carbon by at least four atoms and the anchor group monomer units (a) are other than those having polyoxyalkylene groups, and one of the anchor group monomer units is polymerized 1-(2-methacryloyloxyethyl)-2-imidazolidinone;
   (b) about 5% to about 45% by weight of one or more stabilizer monomer units (b) comprising at least one of a carboxylic acid group in which the carbonyl carbon is separated from the closest ethylenically unsaturated carbon by at least four atoms, a polyoxyalkylene group, a gamma-hydroxy carbamate group, a beta-hydroxy carbamate group, or a combination thereof; and
   (c) up to about 50 percent by weight of aromatic monomer units.

2. A composition according to claim 1, wherein the composition is a coating composition and the material dispersed by the dispersant comprises a pigment.

3. A composition according to claim 2, wherein the composition is aqueous.

4. A composition according to claim 2, wherein the one or more anchor group monomer units (a) comprise active hydrogen functionality and wherein the dispersing polymer is an acrylic polymer that further comprises polymerized 1-(2-methacryloyloxyethyl)-2-imidazolidinone monomer units.

5. A composition according to claim 1, wherein the material dispersed by the dispersant is a member selected from the group consisting of pigments, fillers, nanoparticles, polymers, resins, curing agents, ultraviolet light absorbers including hindered amine light absorbers, antioxidants, catalysts, and powder coating particles.

6. A composition according to claim 1, wherein said anchor group monomer units (a) comprise polymerized monomers selected from the group consisting of acidic monomers, amino monomer's, hydroxyl-functional monomers, acrylamide, methacrylamide, carbamate alkyl(meth)acrylates, carbamyloxyalkyl(meth)acrylates, 1-(2-methacryloyloxyethyl)-2-imidazolidinone, and combinations thereof.

7. A composition according to claim 1, wherein said stabilizer monomer units (b) comprise polymerized monomers selected from the group consisting of β-carboxyethyl acrylate; reaction products of hydroxyalky(meth)acrylates with cyclic carboxylic acid anhydrides; ωmethyloxy-polyoxyethylene (meth)acrylates; ωmethyloxy-poly(oxyethylene-co-oxypropylene) (meth )acrylates; ω-amino-polyoxyethylene (meth)acrylates; ωamino-poly(oxyethylene-co-oxypropylene) (meth)acrylates; acid-functional reaction products of ω-methyloxy-polyoxyethylene (meth)acrylates, ω-methyloxy-poly(oxyethylene-co-oxypropylene) (meth)acrylates, ω-hydroxy-polyoxyethylene (meth)acrylates, and ω-hydroxy-poly(oxyethylene-co-oxypropylene) (meth)acrylates with cyclic anhydrides; beta- and gamma-carbamyloxyhydroxyalkyl (meth)acrylates, and combinations thereof.

8. A composition according to claim 1, wherein said stabilizer monomer units (b) comprise polymerized monomers selected from the group consisting of β-carboxyethyl acrylate, monomethacryloyloxyethyl hexahydrophthalate, ω-methyloxy-polyoxyethylene (meth)acrylates and ω-methyloxy-poly(oxyethylene-co-oxypropylene) (meth)acrylates having molecular weights of at least about 750, and combinations thereof.

9. A composition according to claim 1, wherein the dispersant vinyl or acrylic polymer comprises about 5% to about 45% by weight of one or more stabilizer monomer units (b).

10. A composition according to claim 1, wherein the dispersant vinyl or acrylic polymer comprises about 1% to about 10% by weight monomer units from polymerized 1-(2-methacryloyloxyethyl )-2-imidazolidinone.

11. A composition according to claim 1, wherein the material dispersed by the dispersant comprises a crosslinker.

12. A composition according to claim 1, wherein the composition is a basecoat coating composition.

13. A dispersant, comprising
   (a) one or mole anchor group monomer units (a) having an ionizable or active hydrogen functionality or a functionality that forms a covalent bond with the dispersed material, wherein the ionizable functionality is other than a carboxylic acid group in which the carbonyl carbon is separated from the closest ethylenically unsaturated carbon by at least four atoms and the anchor group monomer units (a) are other than those having polyoxyalkylene groups, and one of the anchor group monomer units is polymerized 1-(2-methacryloyloxyethyl)-2-imidazolidinone;

(b) about 5% to about 45% by weight of one or more stabilizer monomer units (b) having a carboxylic acid group in which the carbonyl carbon is separated from the closest ethylenically unsaturated carbon by at least foul atoms; and (c) up to about 50 percent by weight of aromatic monomer units.

14. A coating composition comprising at least one pigment dispersed in an acrylic polymer, wherein the acrylic polymer is polymerized from a mixture of ethylenically unsaturated monomers comprising:

(a) one or more monomers having active hydrogen functionality;

(b) about 5% to about 45% by weight of one or more monomers selected from the group consisting of monomers having a carboxylic acid group in which the carbonyl carbon is separated from the closest ethylenically unsaturated carbon by at least four atoms, ω-methyloxy-polyoxyethylene (meth)acrylates, ω-methyloxy-poly (oxyethylene-co-oxypropylene) (meth)acrylates, and combinations thereof;

(c) 1-(2-methacryloyloxyethyl )-2-imidazolidinone; and (d) up to about 50 percent by weight of one or more monomers selected from the group consisting of aromatic polymerizable monomers.

15. A waterborne basecoat composition, comprising an aqueous dispersion having at least one pigment dispersed by an acrylic polymer, wherein the acrylic polymer is polymerized from a mixture of ethylenically unsaturated monomers comprising:

(a) one or more monomers having active hydrogen functionality;

(b) about 5% to about 45% by weight of one or more monomers selected from the group consisting of monomers having a carboxylic acid group in which the carbonyl carbon is separated from the closest ethylenically unsaturated carbon by at least four atoms, ω-methyloxy-polyoxyethylene (meth)acrylates, and combinations thereof;

(c) 1-(2-methacryloyloxyethyl)-2-imidazolidinone; and (d) up to about 50 percent by weight of one or more monomers selected from the group consisting of aromatic polymerizable monomers.

16. A method of dispersing a material, comprising: combining the material with a vinyl or acrylic polymer comprising (a) one or more anchor group monomer units (a) having at least one of an ionizable functionality, an active hydrogen functionality, a functionality that forms a covalent bond with the dispersed material, or a combination thereof, wherein the ionizable functionality is other than a carboxylic acid group in which the carbonyl carbon is separated from the closest ethylenically unsaturated carbon by at least four atoms and the anchor group monomer units (a) are other than those having polyoxyalkylene groups, and one of the anchor group monomer units is polymerized 1-(2-methacryloyloxyethyl)-2-imidazolidinone;

(b) about 5% to about 45% by weight of one or more stabilizer monomer units (b) comprising at least one of a carboxylic acid group in which the carbonyl carbon is separated from the closest ethylenically unsaturated carbon by at least four atoms, a polyoxyalkylene group, a gamma-hydroxy carbamate group, a beta-hydroxy carbamate group, or a combination thereof; and (c) up to about 50 percent by weight of aromatic monomer units; and dispersing the mixture in a continuous medium.

17. A method according to claim 16, wherein the material comprises a pigment.

18. A method according to claim 16, wherein the continuous medium is aqueous.

19. A method according to claim 16, wherein the continuous medium comprises a polymer or a resin.

20. A method according to claim 16, wherein the continuous medium is polymeric.

21. A method according to claim 16, wherein the one or mole anchor group monomer units (a) comprise active hydrogen functionality and wherein the acrylic polymer further comprises polymerized hydroxyethylene ethyl urea (meth) acrylate monomer units.

22. A method according to claim 16, wherein the material comprises a member selected from the group consisting of pigments, fillers, nanoparticles, polymers, resins, curing agents, ultraviolet light absorbers including hindered amine light absorbers, antioxidants, catalysts, and powder coating particles.

23. A method according to claim 16, wherein said anchor group monomer units (a) comprise polymerized monomers selected from the group consisting of acidic monomers, amino monomers, hydroxyl-functional monomers, acrylamide, methacrylamide, carbamate alkyl(meth)acrylates, carbamyloxyalkyl(meth)acrylates, 1-(2-methacryloyloxyethyl)-2-imidazolidinone, and combinations thereof.

* * * * *